United States Patent
Boissiere et al.

(10) Patent No.: US 12,255,500 B2
(45) Date of Patent: Mar. 18, 2025

(54) N-PHASE ELECTRIC MACHINE

(71) Applicant: NTN-SNR ROULEMENTS, Annecy (FR)

(72) Inventors: Kevin Boissiere, Annecy (FR); Quentin Bellemin Noel, Paris (FR)

(73) Assignee: NTN-SNR ROULEMENTS, Annecy (FR)

( * ) Notice: Subject to any disclaimer, the term of this patent is extended or adjusted under 35 U.S.C. 154(b) by 196 days.

(21) Appl. No.: 18/027,607

(22) PCT Filed: Sep. 21, 2021

(86) PCT No.: PCT/EP2021/075933
§ 371 (c)(1),
(2) Date: Mar. 21, 2023

(87) PCT Pub. No.: WO2022/063772
PCT Pub. Date: Mar. 31, 2022

(65) Prior Publication Data
US 2023/0387758 A1 Nov. 30, 2023

(30) Foreign Application Priority Data
Sep. 22, 2020 (FR) ..................................... 2009601

(51) Int. Cl.
*H02K 11/00* (2016.01)
*H02K 3/26* (2006.01)
*H02K 11/21* (2016.01)

(52) U.S. Cl.
CPC ........... *H02K 11/0094* (2013.01); *H02K 3/26* (2013.01); *H02K 11/21* (2016.01); *H02K 2203/03* (2013.01); *H02K 2213/03* (2013.01)

(58) Field of Classification Search
CPC ...... H02K 3/26; H02K 11/0094; H02K 11/21; H02K 2203/03; H02K 2213/03
(Continued)

(56) References Cited

U.S. PATENT DOCUMENTS 4,509,001 A  4/1985  Wakabayashi et al.
5,828,195 A  10/1998  Zalesski
(Continued)

FOREIGN PATENT DOCUMENTS

FR 2904412 A1 2/2008
JP 2007189841 A 7/2007
JP 4150133 B2 9/2008

OTHER PUBLICATIONS

Sakamoto et al., English Machine Translation of JP4150133 (Year: 2008).*

(Continued)

*Primary Examiner* — Rashad H Johnson
(74) *Attorney, Agent, or Firm* — MARSHALL, GERSTEIN & BORUN LLP

(57) ABSTRACT

An N-phase electric machine includes a movable member mounted so as to move with respect to a fixed member, a system for determining at least one item of information relating to the movement of the movable member and an electric power supply system which is managed by the item of information, the determination system comprising an encoder having a magnetic track, the fixed member having an armature equipped with at least one conductive coil per phase, the coils being magnetically coupled to the track, the armature having pads around which a coil is respectively arranged, each of the pads having teeth spaced apart by hollows so as to direct the magnetic flux between the coil and the encoder so that the supply of electric power to the coils causes the encoder to move and/or the movement of the encoder causes electric power to be supplied to the coils.

17 Claims, 3 Drawing Sheets

(58) Field of Classification Search
USPC .................................................... 310/68 R
See application file for complete search history.

(56) References Cited

U.S. PATENT DOCUMENTS

| | | | | |
|---|---|---|---|---|
| 6,064,128 | A * | 5/2000 | Yagoto | H02K 41/03 |
| | | | | 310/12.24 |
| 7,262,523 | B1 * | 8/2007 | Faizullabhoy | H02K 11/21 |
| | | | | 310/12.19 |
| 2010/0259112 | A1 | 10/2010 | Chung et al. | |
| 2017/0050668 | A1 * | 2/2017 | Kikuchi | B62D 5/0463 |
| 2022/0021278 | A1 * | 1/2022 | Klassen | H02K 11/21 |
| 2022/0216770 | A1 * | 7/2022 | Frampton | H02K 11/225 |
| 2022/0263396 | A1 * | 8/2022 | Takahashi | H02K 21/30 |
| 2022/0349696 | A1 * | 11/2022 | Launay | G01D 5/16 |
| 2023/0126330 | A1 * | 4/2023 | Boubaker | H02K 1/146 |
| | | | | 310/68 R |
| 2023/0223878 | A1 * | 7/2023 | Woolmer | H02K 11/20 |
| | | | | 318/400.02 |
| 2024/0283382 | A1 * | 8/2024 | Ayeb | H02P 21/20 |

OTHER PUBLICATIONS

International Search Report for Application No. PCT/EP2021/075933, dated Dec. 7, 2021.

* cited by examiner

N-PHASE ELECTRIC MACHINE

CROSS-REFERENCE TO RELATED APPLICATION

This present application is the US national phase of International Patent Application No. PCT/EP2021/075933, filed Sep. 21, 2021, which claims priority to France Application No. FR2009601, filed Sep. 22, 2020. The priority application, FR2009601, is hereby incorporated by reference in its entirety.

The invention relates to an N-phase electric machine comprising a movable member mounted so as to move with respect to a fixed member, a system for determining at least one item of information relating to the movement of said movable member and an electric power supply system which is managed by said item of information.

In a particular application, the machine is electrically powered to actuate the movement of the movable member, for example in order to motorise a device belonging to a driving assistance unit of a motor vehicle. In another application, the machine generates electricity by movement of the movable member in order to be able to power the system.

In particular, electric machines of the permanent magnet synchronous electric motor type are known wherein the fixed member has an armature made of a ferromagnetic material which is equipped with at least one conductive coil per phase, the movable member being secured in movement with at least one permanent magnet per phase.

In this type of electric machine, it might be desirable to know in real-time and with optimum reliability at least one item of information relating to the movement of the movable member, for example a parameter such as its position, its speed, its acceleration or its movement direction, in particular in order to be able to drive the electric power supply of a motor machine and/or control the electricity supplied by a generator machine.

To do so, electric machines are known equipped with a determination system comprising an encoder secured to the movable member which is able to generate a signal representative of its movement, and a sensor secured to the fixed member which is able to determine said item of information by reading the signal generated by said encoder.

According to an embodiment allowing for an optimum resolution of the determined item of information, the encoder has a magnetic track formed by a succession of pairs of North and South magnetic poles which are disposed so as to deliver a pseudo-sinusoidal magnetic field, the sensor comprising at least two sensitive elements disposed at a reading distance from the magnetic track of the encoder.

Nonetheless, such an encoder being dissociated from the magnets of the electric machine, good management of the power supply system by the determined item of information requires indexing of the movable member of the machine, in particular by aligning the measurement of the electrical position of the sensor when the magnetic field of said machine crosses zero or by determining the angle difference between these two positions.

Furthermore, the movement of the electric machine and the determination of the movement item of information then being two distinct functions, the known solutions require having two sets of separate parts, which is detrimental to their compactness.

The invention aims to solve the problems of the prior art by providing in particular an electric machine wherein the functions of electric power supply and determination of at least one item of information relating to the movement of the movable member are carried out jointly, in particular in order to avoid indexing of the movable member with the encoder enabling said determination.

To this end, the invention provides an N-phase electric machine comprising a movable member mounted so as to move with respect to a fixed member, a system for determining at least one item of information relating to the movement of said movable member and an electric power supply system which is managed by said item of information, said determination system comprising an encoder secured to the movable member which is able to generate a signal representative of its movement and a sensor secured to the fixed member which is able to determine said item of information by reading the signal generated by said encoder, said encoder having a magnetic track formed by a succession of $n_{pp}$ pairs of North and South magnetic poles with a width $L_p$ which are disposed so as to deliver a pseudo-sinusoidal magnetic field, the fixed member having an armature made of a ferromagnetic material which is equipped with at least one conductive coil per phase, said coils being electrically connected to the power supply system while being magnetically coupled to the strip of the encoder, the armature having pads around which a coil is respectively arranged, said pads projecting in the interface with the encoder while each having a free surface disposed opposite the magnetic track, said free surface having teeth with a width $L_d$ spaced apart by hollows with a width $L_e$, the widths $L_d$ and/or $L_e$ being such that their ratio to $N*L_p$ is neither even nor inversely even so as to direct the magnetic flux between the coil and the encoder so that the supply of electric power to the coils causes the encoder to move and/or the movement of the encoder causes electric power to be supplied to said coils.

Other particularities and advantages of the invention will appear in the following description, made with reference to the appended figures, wherein.

Figure 1A:
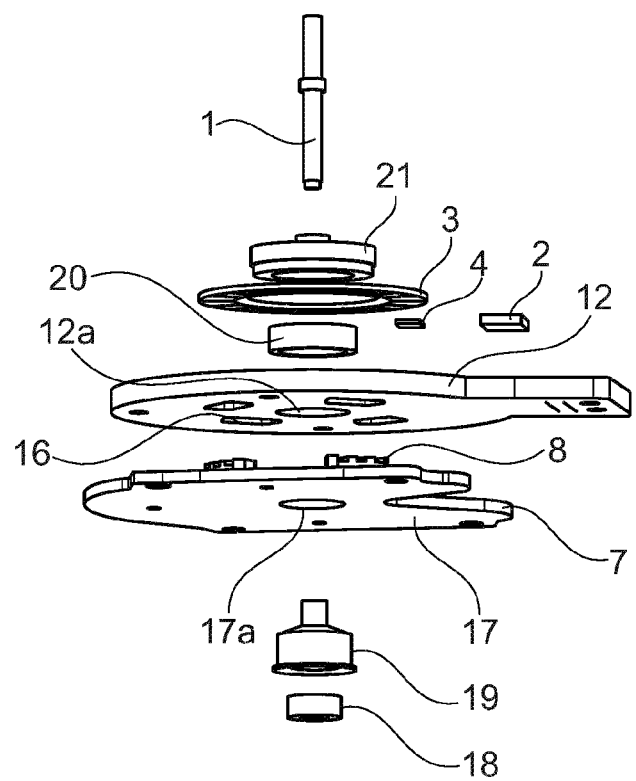
FIGS. 1a and 1b are exploded schematic representations of components of an electric machine according to an embodiment of the invention.

Referring to these figures, an N-phase electric machine is described comprising a movable member 1 mounted so as to move with respect to a fixed member, N being an integer greater than 1, in particular with regards to a two-phase or three-phase electric machine.

According to one application, the machine is electrically powered to actuate the movement of the movable member 1, for example in order to motorise a device belonging to a driving assistance unit of a motor vehicle. In particular, the electric machine may consist of a permanent magnet synchronous motor. In another application, the machine generates electricity by movement of the movable member 1.

The electric machine comprises an electric power supply system 2 which is managed for:
in the case of a motor machine, being able to control the movement of the movable member 1, in particular with regards to the torque and the speed of movement; and/or in the case of a generator machine, controlling its electric power supply, in particular with regards to the frequency of the generated electrical voltage.

To do so, the electric machine comprises a system for determining at least one item of information relating to the movement of the movable member 1, in particular arranged so as to deliver an item of information relating to the position of said movable member, said item of information being used by the power supply system 2 for management thereof. The determined item of information may also relate to the speed, the acceleration and/or the direction of movement of the movable member 1.

The determination system comprises an encoder 3 secured in movement with the movable member 1, said encoder being able to generate a signal representative of its movement, and a sensor 4 secured to the fixed member which is able to determine the item of information by reading the signal generated by said encoder.

According to an embodiment allowing for an optimum resolution of the determined item of information, the encoder 3 has a magnetic track 5 formed by a succession of $n_{pp}$ pairs of North and South magnetic poles 6 with a width $L_p$ which are disposed so as to deliver a pseudo-sinusoidal magnetic field, the sensor 4 comprising at least two sensitive elements disposed at a reading distance from the magnetic track 5 of the encoder 3.

According to an embodiment known in particular from the document EP-1 403 622, the encoder 3 may have a secondary magnetic track allowing in particular determining an absolute position item of information. In particular, the dual-track nature of the encoder allows generating a reference pulse per pair of poles of a motor, which makes it easier to drive.

For example, the encoder 3 is formed by a magnet on which the magnetic poles 6 are formed, in particular by forming at least one magnetic track 5. In particular, the magnet may comprise a matrix, for example made based on a plastic or elastomeric material, in which are scattered magnetic particles, in particular particles of ferrite or rare earths such as NdFeB, which are magnetised according to the succession of poles 6.

Advantageously with regards to the resolution of the delivered item of information, the width $L_p$ of each of the magnetic poles 6 of the encoder 3 is comprised between 0.5 and 20 mm, the number $n_{pp}$ of pairs of magnetic poles 6 of the encoder 3 may be at least equal to 2, in particular greater than 6. In the represented embodiment, 36 pairs of North and South poles 6 form the magnetic track 5 of the encoder 3.

Each of the sensitive elements of the sensor 4 is able to emit a signal which is a function of the field delivered by the track 5, the determination system comprising:
- a device for processing the signals emitted by the sensitive elements which is arranged so as to supply two signals in quadrature and with the same amplitude each representative of the magnetic field; and
- from said signals in quadrature, a device for computing the item of information relating to the movement of the movable member.

According to one embodiment, the document WO-2006/064169 describes a sensor 4 arranged so as to deliver two signals respectively SIN and COS in quadrature and with the same amplitude each representative of the magnetic field delivered by the track 5.

In particular, the sensor 4 may comprise at least one sensitive element, selected in particular from among magnetosensitive probes, for example Hall effect probes, and/or probes based on tunnel effect magnetoresistors (TMR), anisotropic magnetoresistors (AMR) or giant magnetoresistors (GMR).

Moreover, the computer device may comprise interpolation means allowing increasing the resolution of the item of information relating to the movement of the encoder 3.

The fixed member has an armature 7 made of a ferromagnetic material having pads 8, said pads projecting in the interface with the encoder 3 while each having a free surface disposed opposite the magnetic track 5. In particular, the pads 8 are made as one ferromagnetic piece with the armature 7. The air gap distance between the free surface of the pads 8 and the track 5 of the encoder 3 is in the range of 1 mm at most for a ferrite-based magnet and may be up to 10 mm for a rare-earth based magnet.

The armature 7 is equipped with at least one conductive coil 9 per phase which is disposed around a pad 8, said coils being electrically connected to the power supply system 2 while being magnetically coupled to the track 5 of the encoder 3. Thus, the encoder 3 is used as a permanent magnet for the operation of the electric machine, in particular by delivering a magnetic flux, which allows combining with the same means the completion of the functions of electric power supply and determination of at least one item of information relating to the movement of the movable member 1. Furthermore, when the encoder 3 has a secondary magnetic track, the latter also participates in the operation of the machine.

One coil 9 and one pad 8 per electrical phase may be provided. According to another embodiment, several coil 9-pad 8 assemblies per electrical phase may be provided.

According to the represented embodiment, the encoder 3 has an annular magnetic track 5 which is secured to a movable member 1 mounted in rotation. In particular, the coils 9 of the phases may be angularly distributed alternately around the track 5 of the encoder 3 while being electrically connected in series and/or in parallel. Advantageously, the geometric centres of the coils 9 of one phase are angularly spaced by an integer multiple of an angle in the range of $360°/N*n_{pp}$.

In the represented embodiment, the electric machine has two phases and two coil 9-pad 8 assemblies per phase, the coils 9 of one phase being disposed at substantially 180° from each other.

To enable the operation of the electric machine with a standard management of the power supply system 2, the geometric centre of a coil 9 of one phase is angularly spaced from the geometric centre of a coil 9 of another phase by an integer multiple of an angle comprised between:

$90°/N*n_{pp}$ and $270°/N*n_{pp}$ for $N=2$; and $270°/N*n_{pp}$ and $450°/N*n_{pp}$ for $N>2$.

In particular, the geometric centre of a coil 9 of one phase is angularly spaced from the geometric centre of a coil 9 of another phase by an integer multiple of an angle comprised between:

$135°/(N*n_{pp}$ and $225°/N*n_{pp}$ for $N=2$; and $315°/N*n_{pp}$ and $405°/N*n_{pp}$ for $N>2$.

According to one embodiment, the geometric centre of a coil 9 of one phase is angularly spaced from the geometric centre of a coil 9 of another phase by an integer multiple of an angle in the range of $180°/N*n_{pp}$ for $N=2$ and $360°/N*n_{pp}$ for $N>2$, with an angle tolerance of +/−50%.

In the represented embodiment, the coils 9 of respectively one phase are disposed at about 90°, more specifically at 82.5°, from each other to form around the magnetic track 5 an alternating succession of a coil 9 of a first phase, a coil 9 of the other phase, a coil 9 of the first phase, a coil 9 of the other phase.

According to another embodiment, the encoder 3 has a linear magnetic track 5 which is secured to a movable member 1 mounted in translation, the coil 9 of a phase having a geometric centre which is spaced linearly from the geometric centre of a coil 9 of another phase by an integer multiple of a distance comprised between:

$0.5L_p/N*2n_{pp}$ and $1.5L_p/N*2n_{pp}$ for $N=2$; and $L_p/N*n_{pp}$ and $3L_p/N*n_{pp}$ for $N>2$.

In particular, the geometric centre of a coil 9 of one phase is spaced linearly from the geometric centre of a coil 9 of another phase by an integer multiple of a distance comprised between:

$0.75L_p/N*2n_{pp}$ and $1.25L_p/N*2n_{pp}$, in particular being in the range of $L_p/N*2n_{pp}$ for $N=2$; and $1.5L_p/N*n_{pp}$ and $2.5L_p/N*n_{pp}$, in particular being in the range of $2L_p/N*n_{pp}$ for $N>2$.

Figure 4:
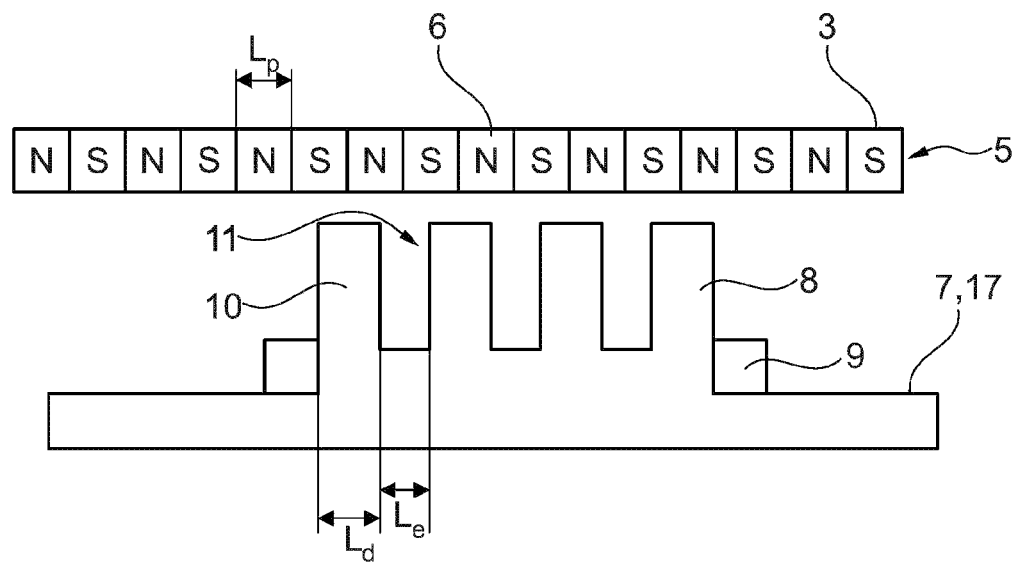
FIG. 4 represents the arrangement of the encoder with respect to the armature in an electric machine according to the invention.

Referring to FIG. 4, the free surface of each of the pads 8 has teeth 10 with a width $L_d$ spaced apart by hollows 11 with a width $L_e$, the widths $L_d$ and/or $L_e$ being such that their ratio to $N*L_p$ is neither even nor inverse even (i.e. the $L_e/N*L_{pp}$ or $L_d/N*L_{pp}$ ratio is not equal to 2, 4 . . . or to ½, ¼, . . . ) so as to direct the magnetic flux between the coil 9 and the encoder 3 so that the supply of electric power to the coils 9 causes the encoder 3 to move and/or the movement of the encoder 3 causes electric power to be supplied to said coils.

In particular, the teeth 10 channel the magnetic flux successively opposite the poles 6 with the same polarity, which creates a relative movement force between the armature 7 and the encoder 3 secured to the movable member 1, said force causing the movement of said movable member in a motor machine or an electric current in the coils 9 of a generator machine.

Thus, thanks to the presence of these tooth 10-hollow 11 assemblies, the magnetic flux density useful for the operation of the electric machine is increased, in order to be able to use magnetic poles 6 with a width $L_p$ reduced enough for the resolution of the determined movement item of information, and that being so without requiring any mechanical indexing since the magnetic operation of the machine is conferred by the encoder 3 which enables the determination of said item of information.

Advantageously, the width $L_d$ of the teeth 10 is similar to the width $L_e$ of the hollows 11. Moreover, the ratio of the width $L_d$ of the teeth 10 and/or of the width $L_e$ of the hollows 11 to $N*L_p$ may be, within a manufacturing tolerance of +/−40%, unitary or fractional.

To limit the formation of a torque contrary to that of the movement of the movable member 1, the depth of the hollows 11 should be as large as possible, in particular by being larger than or equal to the width $L_d$ of the teeth 10. To take account of the manufacturing constraints, the depth of the hollows 11 may be in the range of magnitude of the width $L_d$ of the teeth 10.

According to an advantageous embodiment, each of the coils 9 is formed by several layers of a printed circuit 12 including at least one conductive turn 13, said turns being connected together to form the coils 9. Thus, the coils 9 have a reduced thickness which is favourable to the compactness of the machine, in particular compared to a conventional winding with a copper wire of a machine with an equivalent power. Furthermore, a great robustness of the winding and a simplified construction are obtained compared to the need for a special machine for winding copper wires.

Figure 3A:
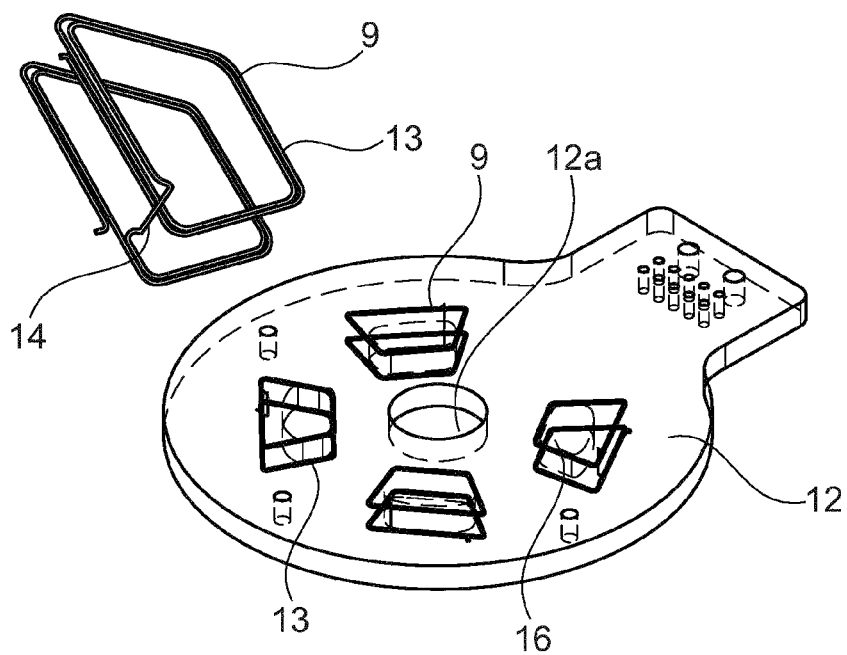
FIGS. 3a and 3b illustrate coils for an electric machine, respectively according to an embodiment of the invention.
Figure 3B:
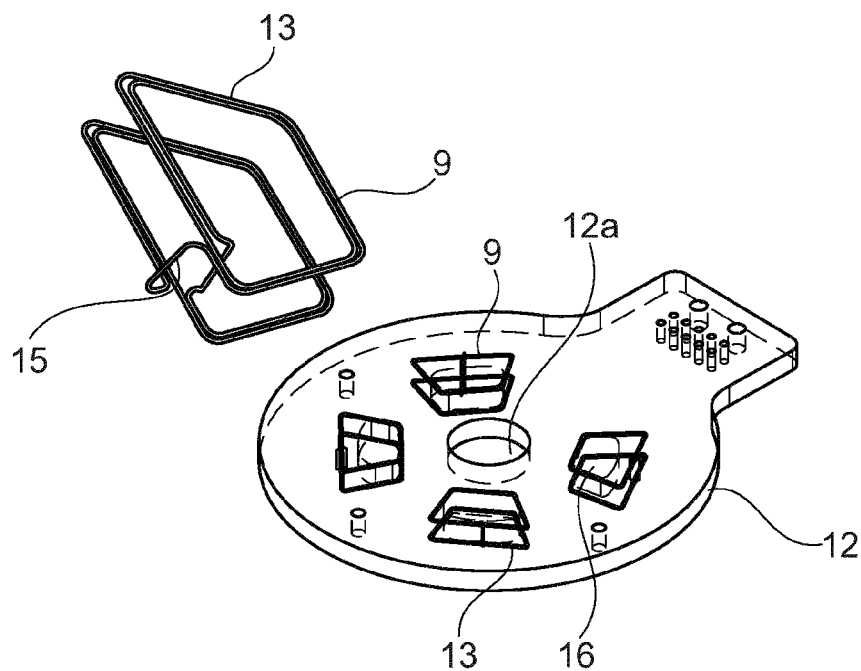

In particular, twenty layers 12 of twelve turns 13 each may be implemented. FIG. 3a schematises two layers 12 of two turns 13 forming a coil 9 comprising a connection 14 of the turns 13 together in series. FIG. 3b represents two layers 12 of two turns 13 forming a coil 9 comprising connections 15 of the turns 13 together in parallel.

Advantageously, the determination system as well as the system for driving the movable member 1 and/or for controlling the electric power supply may be integrated on the printed circuit 12 of the stator of the machine, which allows greatly saving in size and eliminating the needs for connections to an external drive system.

Referring to the figures, the printed circuit 12 has openings 16 in which a pad 8 is respectively disposed. In particular, the armature 7 has a plate 17 at the surface of which the pads 8 are formed, the coils 9 being disposed respectively around a pad 8, in particular by providing that each of the pads 8 extends at the centre of one coil 9.

This embodiment allows for a compact axial stacking of the printed circuit 12 over the armature 7 to form the stator of the machine, the encoder 3 forming the rotor being disposed axially above said printed circuit to form an axial magnetic flux machine wherein the sensor 4 axially reads the item of information delivered by said encoder.

In particular, an encoder 3 with an axial magnetic track 5 is simpler to manufacture than its radial reading equivalent. Advantageously, the encoder 3 is made of elasto- or plasto-ferrite, which allows having great flexibility to quickly select the number of pairs of poles 6 depending on the application.

Figure 1B:
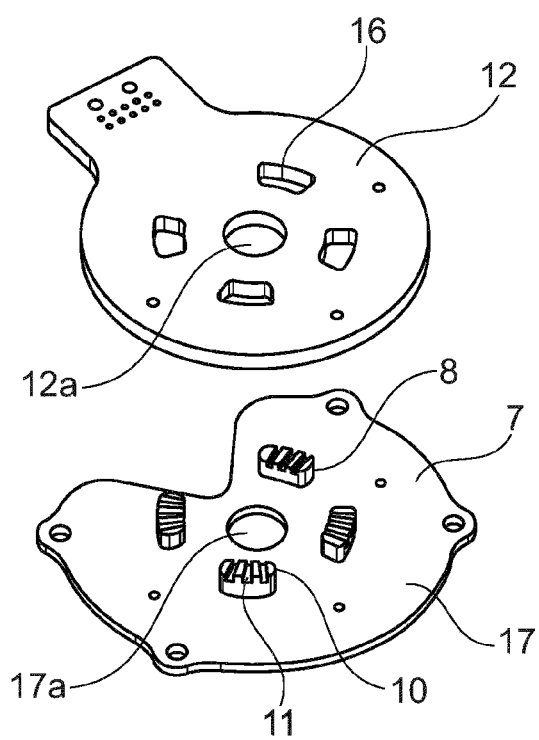
Figure 2:
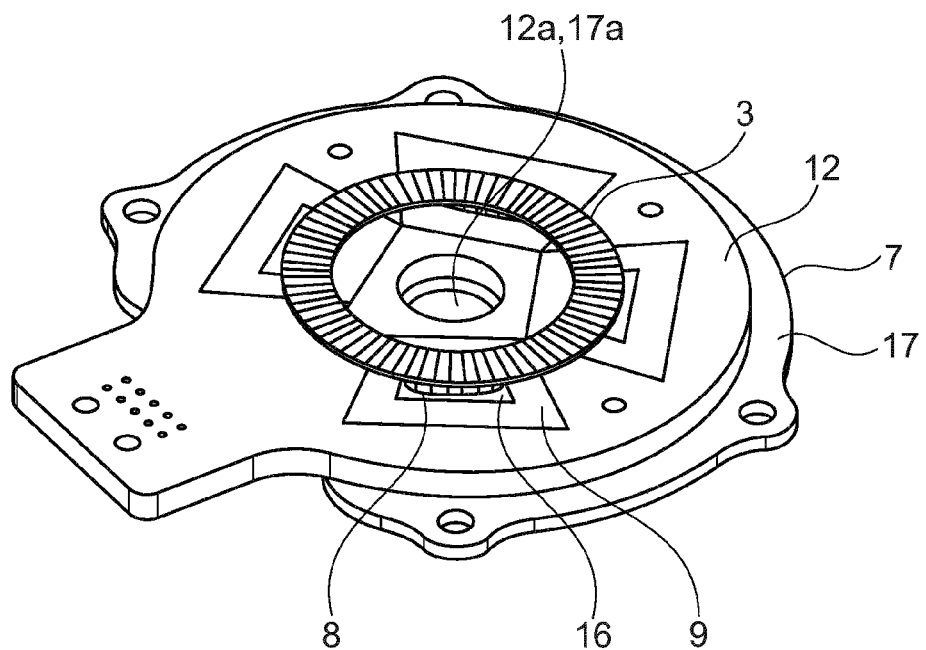
FIG. 2 is a schematic representation in top view of components of the electric machine according to FIGS. 1a and 1b.

Moreover, FIG. 1 represents mounting of the movable member 1 in rotation throughout openings 17a, 12a of the plate 17 and of the printed circuit 12 respectively, by means of two bearings, respectively a lower bearing 18 carried by an integration bell 19 and an upper bearing 20 mounted in an encoder carrier 21.

Advantageously, the sensor 4 and the coils 9 are installed at the surface of a common support, in particular formed by the printed circuit 12, so as to define the relative position between the sensitive elements of said sensor and said coils. In particular, the sensor 4 and the coils 9 may be disposed in a same plane parallel to the surface of the encoder 3, in particular in order to facilitate making of the printed circuit 12.

According to an embodiment, the rotor of the machine may comprise a stacking of multiple encoders 3, the stator may include multiple windings on the printed circuit 12 in order to increase the torque delivered.

The invention claimed is:

1. An N-phase electric machine comprising a movable member mounted so as to move with respect to a fixed member, a system for determining at least one item of information relating to the movement of said movable member and an electric power supply system which is managed by said item of information, said determination system comprising an encoder secured to the movable member which is able to generate a signal representative of its movement and a sensor secured to the fixed member which is able to determine said item of information by reading the signal generated by said encoder, said encoder having a magnetic track formed by a succession of npp pairs of North and South magnetic poles with a width $L_p$ which are disposed so as to deliver a pseudo-sinusoidal magnetic field, the fixed member having an armature made of a ferromagnetic material which is equipped with at least one conductive coil per phase, said coils being electrically connected to the power supply system while being magnetically coupled to the track of the encoder, the armature having pads around which a coil is respectively arranged, the pads projecting in the interface with the encoder while each having a free surface disposed opposite the magnetic track, said free surface having teeth with a width $L_d$ spaced apart by hollows with a width $L_e$, the widths $L_d$ and/or $L_e$ being such that their ratio to $N*Lp$ is neither even nor inversely even so as to direct the magnetic flux between the coil and the encoder so that the supply of electric power to the coils causes the encoder to move and/or the movement of the encoder causes electric power to be supplied to said coils.

2. The electric machine according to claim 1, the encoder having an annular magnetic track which is secured to a movable member mounted in rotation, the coil of one phase having a geometric centre which is angularly spaced from the geometric centre of a coil of another phase by an integer multiple of an angle comprised between:

$90°/N*n_{pp}$ and $270°/N*n_{pp}$ for $N=2$; and $270°/N*n_{pp}$ and $450°/N*n_{pp}$ for $N>2$.

3. The electric machine according to claim 2, the geometric center of a coil of one phase being spaced angularly from the geometric center of a coil of another phase by an integer multiple of an angle comprised between:

$0.5L_p/N*2n_{pp}$ and $1.5L_p/N*2n_{pp}$ for $N=2$; and $L_p/N*n_{pp}$ and $3L_p/N*n_{pp}$ for $N>2$.

4. The electric machine according to claim 1, the encoder having a linear magnetic track which is secured to a movable member mounted in translation, the coil of a phase having a geometric centre which is spaced linearly from the geometric centre of a coil of another phase by an integer multiple of a distance comprised between:

$0.5L_p/N*2n_{pp}$ and $1.5L_p/N*2n_{pp}$ for $N=2$; and $L_p/N*n_{pp}$ and $3L_p/N*n_{pp}$ for $N>2$.

5. The electric machine according to claim 4, the geometric center of a coil of one phase is spaced linearly from the geometric centre of a coil of another phase by an integer multiple of a distance comprised between:

$0.75L_p/N*2n_{pp}$ and $1.25L_p/N*2n_{pp}$, for $N=2$; and $1.5L_p/N*n_{pp}$ and $2.5L_p/N*n_{pp}$, for $N>2$.

6. The electric machine according to claim 1, the width Lp of each of the magnetic poles of the encoder being is comprised between 0.5 and 20 mm.

7. The electric machine according to claim 1, the number npp of pairs of magnetic poles of the encoder being at least equal to 2, in particular being greater than 6.

8. The electric machine according to claim 1, the sensor comprising at least two sensitive elements disposed at a reading distance from the magnetic track of the encoder, each of said elements being adapted to emit a signal which is a function of the field delivered by said track, the determination system comprising:
- a device for processing the signals emitted by the sensitive elements which is arranged so as to supply two signals in quadrature and with the same amplitude each representative of the magnetic field; and
- from said signals in quadrature, a device for computing the item of information relating to the movement of the movable member.

9. The electric machine according to claim 8, the computer device comprising interpolation means allowing increasing the resolution of the item of information relating to the movement of the encoder.

10. The electric machine according to claim 1, further comprising several coil-pad assemblies per electric phase.

11. The electric machine according to claim 1, comprising an axial stack of a printed circuit on the armature to form a stator, the encoder forming a rotor being disposed axially above said printed circuit to form an axial magnetic flux machine wherein the sensor axially reads the item of information delivered by said encoder.

12. The electric machine according to claim 1, each of the coils being formed of several layers of a printed circuit including at least one conductive turn, said turns being connected together to form the coils.

13. The electric machine according to claim 1, the width $L_d$ of the teeth being similar to the width $L_e$ of the hollows.

14. The electric machine according to claim 1, a ratio of the width $L_d$ of the teeth and/or of the width $L_e$ of the hollows to $N*L_p$ being, within a manufacturing tolerance of +/−40%, unitary or fractional.

15. The electric machine according to claim 1, the hollows having a depth which is larger than or equal to the width $L_d$ of the teeth.

16. The electric machine according to claim 1, the sensor and the coils being installed at a surface of a printed circuit.

17. The electric machine according to claim 1, the power supply system being able to use the item of information delivered by the determination system to drive the movement of the movable member and/or to control its electric power supply via the coils.

* * * * *

UNITED STATES PATENT AND TRADEMARK OFFICE
CERTIFICATE OF CORRECTION

PATENT NO. : 12,255,500 B2
APPLICATION NO. : 18/027607
DATED : March 18, 2025
INVENTOR(S) : Kevin Boissiere et al.

It is certified that error appears in the above-identified patent and that said Letters Patent is hereby corrected as shown below:

In the Claims

Column 6, Line 66, Claim 1, "npp" should be -- $n_{pp}$ --.

Column 7, Line 1, Claim 1, "pseudo -sinusoidal" should be -- pseudo-sinusoidal --.

Column 7, Line 12, Claim 1, "N*Lp" should be -- $N*L_p$ --.

Column 7, Line 32, Claim 3, "$0.5L_p/N*2n_{pp}$ and $1.5L_p/N*2n_{pp}$ for N=2; and" should be -- $135°/N*n_{pp}$ and $225°/N*n_{pp}$, for N=2; and --.

Column 7, Line 34, Claim 4, "$L_p/N*n_{pp}$ and $3L_p/N*n_{pp}$ for N>2." should be -- $315°/N*n_{pp}$ and $405°/N*n_{pp}$, for N>2. --.

Column 8, Line 1, Claim 6, "Lp" should be -- $L_p$ --.

Column 8, Lines 2-3, Claim 6, "is comprised between" should be -- between --.

Column 8, Line 5, Claim 7, "npp" should be -- $n_{pp}$ --.

Column 8, Line 6, Claim 7, "2, in particular being greater than 6." should be -- 2. --.

Column 8, Line 24, Claim 10, "coil -pad" should be -- coil-pad --.

Column 8, Line 25, Claim 11, "comprising" should be -- further comprising --.

Signed and Sealed this
Twenty-sixth Day of August, 2025

Coke Morgan Stewart
*Acting Director of the United States Patent and Trademark Office*